(12) United States Patent
Taylor et al.

(10) Patent No.: US 12,391,814 B2
(45) Date of Patent: Aug. 19, 2025

(54) OPEN CELL POLYURETHANE FLAME-RETARDANT FOAMS

(71) Applicant: ICP Construction, Inc., Andover, MA (US)

(72) Inventors: Anthony J. Taylor, Medina, OH (US); Andrew P. Shinko, Uniontown, OH (US); Mark A. Keen, Uniontown, OH (US)

(73) Assignee: ICP CONSTRUCTION, INC., Andover, MA (US)

( * ) Notice: Subject to any disclaimer, the term of this patent is extended or adjusted under 35 U.S.C. 154(b) by 0 days.

(21) Appl. No.: 17/562,514

(22) Filed: Dec. 27, 2021

(65) Prior Publication Data

US 2023/0203259 A1 Jun. 29, 2023

(51) Int. Cl.
| | |
|---|---|
| *C08G 18/08* | (2006.01) |
| *C08G 18/12* | (2006.01) |
| *C08G 18/16* | (2006.01) |
| *C08G 18/18* | (2006.01) |
| *C08G 18/20* | (2006.01) |
| *C08G 18/22* | (2006.01) |
| *C08G 18/24* | (2006.01) |
| *C08G 18/30* | (2006.01) |
| *C08G 18/32* | (2006.01) |
| *C08G 18/42* | (2006.01) |
| *C08G 18/61* | (2006.01) |
| *C08G 18/76* | (2006.01) |
| *C08G 77/46* | (2006.01) |
| *C08J 9/00* | (2006.01) |
| *C08J 9/14* | (2006.01) |
| *C08K 5/521* | (2006.01) |
| *C08L 75/04* | (2006.01) |
| *C08G 101/00* | (2006.01) |

(52) U.S. Cl.
CPC ............ *C08J 9/0038* (2013.01); *C08G 18/12* (2013.01); *C08G 18/14* (2013.01); *C08G 18/2081* (2013.01); *C08G 18/242* (2013.01); *C08G 18/302* (2013.01); *C08G 18/4213* (2013.01); *C08G 18/61* (2013.01); *C08G 18/7671* (2013.01); *C08G 77/46* (2013.01); *C08J 9/146* (2013.01); *C08K 5/521* (2013.01); *C08G 2101/00* (2013.01); *C08G 2110/0041* (2021.01); *C08J 2203/162* (2013.01); *C08J 2205/05* (2013.01); *C08J 2207/04* (2013.01); *C08J 2375/06* (2013.01)

(58) Field of Classification Search
CPC .......................... C08G 18/161; C08G 18/2081
See application file for complete search history.

(56) References Cited

U.S. PATENT DOCUMENTS

| | | | | |
|---|---|---|---|---|
| 5,762,822 A | * | 6/1998 | Tucker | ..................... C08J 9/149 521/53 |
| 2011/0144216 A1 | * | 6/2011 | Hulse | ..................... A01N 29/02 426/534 |
| 2012/0248371 A1 | * | 10/2012 | Ross | ..................... C08G 18/546 252/182.15 |
| 2014/0171527 A1 | * | 6/2014 | Yu | ...................... C08G 18/1816 521/126 |
| 2014/0343180 A1 | * | 11/2014 | Crain | ....................... C08J 9/143 521/137 |
| 2015/0274967 A1 | * | 10/2015 | Taylor | ..................... C08J 9/146 521/107 |
| 2016/0200890 A1 | * | 7/2016 | Taylor | ................. C08G 18/225 521/125 |
| 2016/0272772 A1 | | 9/2016 | Manville | |
| 2017/0152364 A1 | * | 6/2017 | Ling | ......................... C08J 9/149 |
| 2018/0079881 A1 | * | 3/2018 | Zhang | .................. C08G 18/163 |
| 2018/0085766 A1 | * | 3/2018 | Gantenbein | ........... B05B 7/0025 |
| 2019/0055454 A1 | * | 2/2019 | Zielinski | ............... C08G 18/022 |
| 2019/0077934 A1 | * | 3/2019 | Shinko | ............... C08G 18/4829 |
| 2020/0247941 A1 | * | 8/2020 | Yu | ...................... C08G 18/4018 |

(Continued)

FOREIGN PATENT DOCUMENTS

| | | |
|---|---|---|
| JP | 2849332 B2 | 11/1998 |
| JP | 3272971 B2 | 1/2002 |

(Continued)

OTHER PUBLICATIONS

"CAS Registry No. 25038-59-9" from the American Chemical Society, 2023 (Year: 2023).*

(Continued)

*Primary Examiner* — Melissa A Rioja
(74) *Attorney, Agent, or Firm* — Fredrikson & Byron, P.A.

(57) ABSTRACT

The invention pertains generally to a process and a composition-of-matter for a shelf-stable open cell polyurethane HFO-blown two-component polyurethane foam composition having improved flame-retardant properties through the use of at least one organo-tin containing catalyst and at least one potassium containing catalyst; and at least one dimorpholino-based ether catalyst, a ratio of the at least one potassium-containing catalyst to the tin-containing catalyst being at least approximately 1.5:1.0, the at least one surfactant comprising a polydimethylsiloxane (PDMS) backbone and polyethylene oxide-co-propylene oxide (PEO-PPO) random copolymer grafts; and the added water comprises at least 8 weight percent of said B-side reactants, the polyurethane foam having a Class B rating with a flame spread between 25 and 75 inclusive and a smoke developed of under 450 using ASTM E 84 testing protocol.

18 Claims, No Drawings

(56) References Cited

U.S. PATENT DOCUMENTS

2021/0023576 A1* 1/2021 Shinko .................. C09J 5/00
2021/0079189 A1* 3/2021 Shinko ................ C08G 18/242

FOREIGN PATENT DOCUMENTS

JP          2009138134 A1    6/2009
JP             5530064 B2    4/2014

OTHER PUBLICATIONS

ICC-ES Evaluation Report ESR-2717 reissued Jul. 2019 for Handi-Foam E-84 Class 1(A) Spray Foam Adhesive.
Technical Data Sheet for Handi-Foam Low Pressure E84 II-12, II-22 Spray Foam Rev 10/2017-21.
Consortium for Advanced Residential Buildings Steven Winter Associates, Improving the Built Environment, Last Update Apr. 3, 2009.
Energy Efficient Solutions, Spray Foam Insulation: Quick Cure E-84 (Class 1) copyright 2021.
Lapolla Two Component E84 Class 1 Spray Foam Technical Data Sheet (undated).
Tiger Foam, Safety Data Sheet Low Pressure Polyurethane Foam, Revised Oct. 2019.
BASF Technical Data Sheet, Walltite US Series, Building Envelope Insulation Air Barrier, Revision Date Jul. 19, 2017.

* cited by examiner

OPEN CELL POLYURETHANE FLAME-RETARDANT FOAMS

CROSS-REFERENCE TO RELATED APPLICATIONS

None.

TECHNICAL FIELD

The invention described herein pertains generally to open cell polyurethane foams having flame-retardant properties, and which are blown using at least one hydrofluoroolefin ("HFO") propellant and further which meet ASTM E 84 testing protocols or the Appendix X test. These tests place strict limits on such characteristics as the flame spread and smoke development characteristics of a spray foam when the spray foam is exposed to fire. Passage of these tests is important for enabling wide-spread commercial use of a spray foam product. However, these tests are stringent, and fire retardants may be added to the foam formulation to improve the fire performance of a foam, or other measures may be taken to improve the fire retardancy of a foam. For example, intumescent coatings may be applied to spray polyurethane foams, adding cost and complexity to the installation process. Embodiments of the present technology address shortcomings and inefficiencies of conventional spray foams and methods of making or using spray foams.

BACKGROUND OF THE INVENTION

Embodiments of the present invention produce an open cell spray foam that can pass stringent fire retardancy tests, such as Appendix X and/or ASTM E 84. The ASTM E 84 Class 1 rating for flame spread and smoke development requires the criteria that the laminate must have a flame spread of 25 or less and a smoke development of 450 or less. Section 803 Wall and Ceiling Finishes, Paragraph 803.1 General states, "Interior wall and ceiling finishes shall be classified in accordance with ASTM E-84. Such interior finish materials shall be grouped in the following classes in accordance with their flame spread and smoke-developed indexes (i) Class A: Flame Spread 0-25; smoke-developed 0-450; (ii) Class B: Flame Spread 26-75; smoke-developed 0-450; and (iii) Class C: Flame Spread 76-200; smoke-developed 0-450.

The open cell spray foams may include a polyurethane or a polyisocyanurate formed with a unique combination of reactants, including, but not limited to: at least one aromatic polyester polyol/at least one plasticizers/at least three catalysts/a significant (greater than 8 wt. % added water/blowing agent, each component added in a sufficient amount to effect the open cell content required.

Two-component low pressure (less than 250 psi) spray polyurethane foam (SPF) kits require enough blowing agent to fully dispense the contents of both the A-side (isocyanate) and B-side (polyols, surfactants, catalysts, etc.) chemicals. This must be done in such a manner where both A and B components are propelled at a predetermined ratio that is maintained throughout the dispensing of the product. On the other hand, one component low pressure polyurethane foam (OCF) systems are already pre-mixed in closed systems where the A/B ratio is predefined. OCF systems are typically blown with hydrocarbons, but flammability concerns restrict their usage in certain sizes. Since most SPF kits are dispensed in pressurized cylinders, less flammable blowing agents must be considered. The blowing agent(s) used must be at least partially miscible with both A-sides and B-sides and should not react with either contents.

Previous blowing agents for SPF systems have included chlorofluorocarbons (CFCs) and hydrochlorofluorocarbons (HCFCs). These blowing agents, while reliable, are a threat to the stability of the ozone layer due to their ability to release chlorine atoms under ultraviolet light exposure. Free chlorine atoms readily react with ozone; therefore, compounds such as CFCs and HCFCs are said to have high ozone depletion potential (ODP). The Montreal Protocol was established in part to reduce emissions deemed responsible for the growth in the ozone layer hole. This agreement and subsequent additions were ratified by the maximum number of UN signatories. Due to this widespread acceptance, CFC and HCFC propellants were phased out and replaced by hydrofluorocarbon (HFC) blowing agents in the late 1990's and early 2000's.

HFC-134a became the non-flammable blowing agent of choice for the low-pressure SPF industry due to relative ease of transition among other factors. While HFC-134a and other HFC blowing agents have an ODP value of zero, these compounds reportedly have a high global warming potential (GWP). Unlike ODP, GWP is measured by atmospheric residence time and infrared radiation absorption relative to the Earth's atmosphere. These factors determine the radiative forcing of the molecule. A positive radiative forcing value indicates a higher potential for warming the planet; that is, more solar radiation is absorbed than reflected out to space. The radiative forcing of a particular molecule is compared against the radiative forcing of carbon dioxide. The resulting number is the GWP of the molecule, with carbon dioxide given a GWP of 1. Radiative forcing is not a linear quantity, however, and is dependent on external factors such as climate sensitivity and molecule-specific pulse emissions over a particular time period, denoted as time horizons measured in 20, 100, and 500 years. For instance, the global warming potential of 134a decreases with increasing time horizon, but the global warming potential of many perfluorocarbons increases with increasing time horizon. Because of this discrepancy, most GWP values are typically reported at a time horizon of 100 years. In addition, GWP values have changed over time as improved modeling and empirical data becomes readily available. To this end, the GWP of HFC-134a reported by the Intergovernmental Panel on Climate Change has changed from: 1300 in 2001; to 1430 in 2007; to 1550 in 2013.

While the abundance of HFCs in the Earth's atmosphere is much less than that of carbon dioxide, HFC emissions are projected to grow between 7-19% to that of carbon dioxide emissions by 2050. This may result in the total radiative forcing of HFCs increasing by a factor of 10 to 30 times by 2050. In light of this and other data, the Kyoto Protocol was established in order to reduce greenhouse gas emissions, which included HFCs. This new agreement has gained traction, especially in the United States. A Significant New Alternative Policy (SNAP) ruling by the EPA had established effective end dates for producing foaming products with HFC blowing agents. The current proposed date for unacceptable HFC usage is Jan. 1, 2020 for rigid polyurethane one-component foams and Jan. 1, 2021 for rigid polyurethane low pressure two-component foams. Although the rule has since been vacated, changes remain in effect at state-level and jurisdictions outside the United States. A New policy is expected soon.

Potential low GWP replacements for HFC blowing agents include hydrofluorooelfin (HFO) blowing agents. Specifically, the Solstice® Gas Blowing agent (GBA, HFO-1234ze, trans 1,3,3,3 tetrafluoropropene) produced by Honeywell has been proposed as a blowing agent for low pressure SPF systems. Attractive properties of HFO-1234ze include a low boiling point (−19° C.) and favorable kauri-butanol solubility (12.5 compared to 9.2 for HFC-134a). In addition, HFO-1234ze has an ODP of zero, is volatile organic carbon (VOC) exempt, and has a GWP of less than 1 due in part to its low atmospheric lifetime (~18 days) compared with HFC-134a (13.4 years).

Although HFO blowing agents like HFO-1234ze meet requirements for the Kyoto Protocol (GWP<150) and are cleared for use under SNAP 21, the short lifespan of the molecule has led to challenges with the product shelf life of closed SPF systems. Stated earlier, SPF systems contain A-side (isocyanate) and B-side (resin) components stored separately under pressure. Both contents require propellants to fully dispense these mixtures. HFO-1234ze and other HFO blowing agents tend to break down and interact with moieties in the B-side. HFO molecules are believed to react with amine catalysts, for example, via nucleophilic substitution. This reaction is believed to produce hydrofluoric acid, which in turn attack surfactants and polyols. Such phenomenon has been observed via nuclear magnetic resonance (NMR) and gas chromatography-mass spectrometry. These undesirable reactions yield a significant reduction in foam properties, particularly gelation and tack-free times, foam appearance, cell structure, and mechanical properties among others. Consequently, a simple 1:1 substitution of an HFC blowing agent with an HFO blowing agent in a polyurethane SPF system can reduce shelf life from one year or greater to a matter of weeks or days. Therefore, systems that were stable in HFCs must undergo modifications in order to meet the demand of shelf life stability and superior foam properties. Any formulated HFO adhesive must emulate the spray characteristics and general physical properties of the current HFC-blown two-component products currently on the market. The product must be shelf-life stable for at least 12 months. HFO-1234ze was selected as the blowing agent of choice for this study.

This invention was developed to overcome some of the limitations of the teachings of the Prior Art, namely, to improve the flame retardance of two-component open celled polyurethane foams. The present invention overcomes some of the limitations taught in the prior art by teaching that an HFO blown open cell, two-component polyurethane foam can be synthesized having flame retardant properties which meet ASTM E 84, the low-pressure two-component open cell polyurethane foam composition in which "A-side" and "B-side" reactants comprise:

the A-side which comprises:
  at least one A-side diisocyanate and at least one HFO propellant;
the B-side comprises:
  at least one aromatic polyol, at least one B-side plasticizer, at least one surfactant, at least three catalysts, water and at least one HFO propellant;
  said at least three catalysts comprising
    at least one organo-tin containing catalyst and
    at least one potassium containing catalyst; and
    at least one dimorpholino-based ether catalyst;
    a ratio of the at least one potassium-containing catalyst to the tin-containing catalyst being at least approximately 1.5:1.0;
  the at least one surfactant comprising a polydimethylsiloxane (PDMS) backbone and polyethylene oxide-co-propylene oxide (PEO-PPO) random copolymer grafts;

the added water comprises at least 8 weight percent of said B-side reactants;
the polyurethane foam having a Class B rating with a flame spread between 25 and 75 inclusive and a smoke developed of under 450 using ASTM E 84 testing protocol;
the polyurethane foam having a density of approximately 1 pcf (pounds per cubic foot) or less;
the polyurethane foam having an R-value of 3.2 or greater; and
an open cell content of at least 90% in the polyurethane foam composition.

SUMMARY OF THE INVENTION

The present invention is directed generally to a shelf-stable polyurethane HFO-blown two-component polyurethane foam composition which includes controlling the ratio of tin-containing catalyst(s) to potassium-containing catalyst(s) in combination with a dimorpholino-based catalyst.

In one aspect of the invention, a process and composition is disclosed for synthesizing a low-pressure open cell, two-component polyurethane foam composition in which "A-side" and "B-side" reactants comprise: at least one A-side diisocyanate and at least one HFO propellant; at least one aromatic B-side polyol, at least one B-side plasticizer; at least one surfactant, at least three catalysts, water and an HFO propellant; the at least three catalysts comprising at least one tin-containing catalyst and at least one potassium-containing catalyst and at least one dimorpholino-based catalyst; the catalytic decay ratio of the polyurethane foam being approximately equal to or less than 2; the initial open cell content of at least approximately 90%; the polyurethane foam having a dimensional stability with no greater than approximately a 5% volume change after accelerated aging; the polyurethane foam having an initial compression of under approximately 10 psi; the polyurethane foam optionally having a dimensional stability of approximately ±5%; and the process comprising the step of adding the at least one potassium-containing catalyst and at least one tin organometallic catalyst in a weight ratio of approximately equal to or greater than 1.5:1.0.

These and other objects of this invention will be evident when viewed considering the detailed description and appended claims.

DETAILED DESCRIPTION OF THE INVENTION

The best mode for carrying out the invention will now be described for the purposes of illustrating the best mode known to the applicant at the time of the filing of this invention. The examples and figures are illustrative only and not meant to limit the invention, as measured by the scope and spirit of the claims.

Unless the context clearly indicates otherwise: the word "and" indicates the conjunctive; the word "or" indicates the disjunctive; when the article is phrased in the disjunctive, followed by the words "or both" or "combinations thereof" both the conjunctive and disjunctive are intended.

As used in this application, the term "approximately" is within 10% of the stated value, except where noted.

As used in this application, the term "catalytic decay ratio" or "CDR" is defined as the ratio of accelerated aging gel time to that of initial gel time. This value was recorded in order to determine gel time shift over the age of the system. A low CDR would indicate greater catalytic stability over that of a high CDR. For long term stability, the CDR ratio should remain less than or equal to approximately 2.5, more preferably less than or equal to approximately 2.0.

As used in this application, the term "open cell content" is defined as 90% or greater, preferably 92% or greater, more preferably 94% or greater. By converse, "closed cell content" is defined as 100% minus the open cell content.

As also used in this application, "shelf life" means a polyurethane foam which when subjected to accelerated aging, still results in a foam having physical properties such as foam height, gel time, density, etc., preferably within approximately 20% of those parameters prior to accelerated aging.

As further used in this application, "accelerated aging" means storing the reactant combination and propellant at 50° C. for 12-48 days prior to reacting the "A" and "B" cylinders and spraying the polyurethane foam. Using the Arrhenius equation, this equates to 3-12 months at room temperature.

As additionally used in this application, "low-pressure" means a pressure less than 250 psi at room temperature. Typically, the pressure in the full cylinders is between approximately 80-115 psi.

The literature would appear to teach that to achieve shelf life stability for an HFO propellant-based two-component polyurethane composition, there should preferably be at least one aromatic polyester polyol (in a major amount) and no more than approximately 10% aliphatic polyether polyol. The literature appears to highlight the benefits of polyester polyols, and more specifically aromatic polyester polyols, over those of aliphatic polyether polyols. This composition was believed to be counterintuitive, as one skilled in the art might expect the polyester polyols to be problematic due to the polyester polyols being greater nucleophiles and, therefore, more susceptible to attack. The prior art would appear to be teaching that polyether polyols seem to be significantly detrimental to the shelf life of the foam product. See United States Published Patent Application No. 2019/0092910.

In this application, a shelf-life stable formula blown with a gaseous hydrofluoroolefin (HFO) was selected in the following study to show differences between catalysts, particularly those with tin and potassium in their chemical composition, as related to accelerated shelf stability of the polyurethane formulation.

The invention will now be described by a series of examples and identification of various reactants used in the invention.

Polyols

As illustrated in a non-exhaustive, non-exclusive, exemplary list below, there are a myriad of polyols (both polyester polyols and polyether polyols) which are useful in effecting the reaction with a diisocyanate to form a foam having varying characteristics. The ability to add widely varying amounts of polyols and/or different polyol combinations could easily be affected via either supplementing existing amounts of "B-side" polyol(s) via the third stream or by essentially eliminating "B-side" polyol(s) and making their addition via the third stream. In one aspect of the invention, the polyol(s) are added by using a pumping mechanism from a "B-side" cylinder or other container, and the third stream is employed to add the blowing agent and/or pressurizing agent.

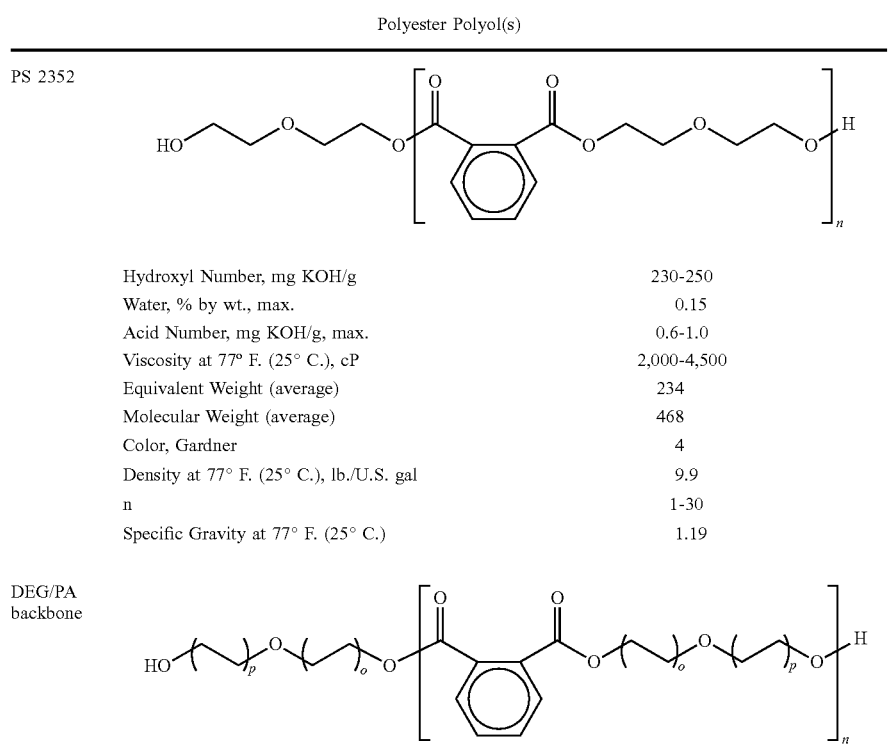

| Polyester Polyol(s) | |
|---|---|
| PS 2352 | |
| Hydroxyl Number, mg KOH/g | 230-250 |
| Water, % by wt., max. | 0.15 |
| Acid Number, mg KOH/g, max. | 0.6-1.0 |
| Viscosity at 77° F. (25° C.), cP | 2,000-4,500 |
| Equivalent Weight (average) | 234 |
| Molecular Weight (average) | 468 |
| Color, Gardner | 4 |
| Density at 77° F. (25° C.), lb./U.S. gal | 9.9 |
| n | 1-30 |
| Specific Gravity at 77° F. (25° C.) | 1.19 |
| DEG/PA backbone | | n ranges from 1-30 inclusive;
o ranges from 1 to 5 inclusive; and
p ranges from 1 to 5 inclusive;

-continued

| Polyester Polyol(s) | |
|---|---|
| TB-350 | 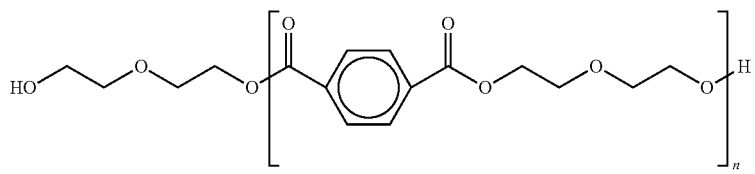 |

| | |
|---|---|
| Hydroxyl Number, mg KOH/g | 335-365 |
| Water, % by wt., max. | 0.15 |
| Acid Number, mg KOH/g, max. | 0.5-2.0 |
| Viscosity at 77° F. (25° C.), cP | 2,500-3,500 |
| Color, Gardner | 4-5 |
| Specific Gravity at 77° F. (25° C.) | 1.233 |
| Functionality | 2.2 |
| n | 1-25 |

DEG/TA backbone (diethylene glycol terephthalate anhydride)

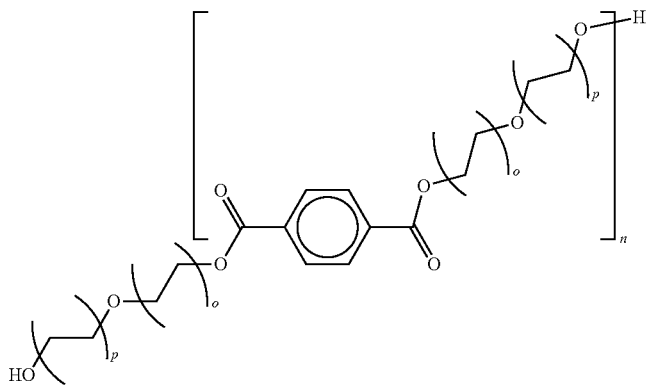

n ranges from 1-30 inclusive;
o ranges from 1 to 5 inclusive; and
p ranges from 1 to 5 inclusive;

| | |
|---|---|
| Stepanpol® PS-3152 | Aromatic diethylene glycol-phthalic anhydride polyester polyol (DEG/PA backbone)- avg. viscosity @ 25° C.~2756 cP; Avg.~350; and Hydroxyl Value (mgKOH/g)~ 300-350 |
| Isoexter 3061 | Aromatic phthalic anhydride polyester polyol |
| Stepanpol® PC 2011-225 | Saturated polyester polyol (DEG/AA backbone) wherein AA = adipic acid)-avg. viscosity @ 25° C.~400-600 cP; Avg. MW~500; and Hydroxyl Value (mgKOH/g)~ 215-235 |
| Stepanpol® PDP-70 | Hybrid phthalate anhydride polyester polyol (DEG/PA backbone)-avg. viscosity @ 25° C.~1900 cP; Avg. MW~1600; and Hydroxyl Value (mgKOH/g)~70 |
| Stepanpol® PS-3422 | Aromatic polyester polyol |
| Stepanpol® PS-1752 | Aromatic phthalic anhydride polyester polyol (DEG/PA backbone)-avg. viscosity @ 25° C.~3900 cP; Avg. MW~640; and Hydroxyl Value (mgKOH/g)~175 with some propylene carbonate (unspecified by the manufacturer) |

Flame Retardants and/or Plasticizers

As illustrated in a non-exhaustive, non-exclusive, exemplary list below, there are a myriad of flame retardants and/or plasticizers which are useful in modifying the properties of the reaction of a polyol with a diisocyanate to form a foam having varying characteristics. The ability to add widely varying amounts of flame retardants/plasticizers and/or different flame retardant/plasticizer combinations could easily be effected via either supplementing existing amounts of "B-side" flame retardant(s)/plasticizer(s) via the third stream or by essentially eliminating "B-side" flame retardant(s)/plasticizer(s) and making their addition via the third stream.

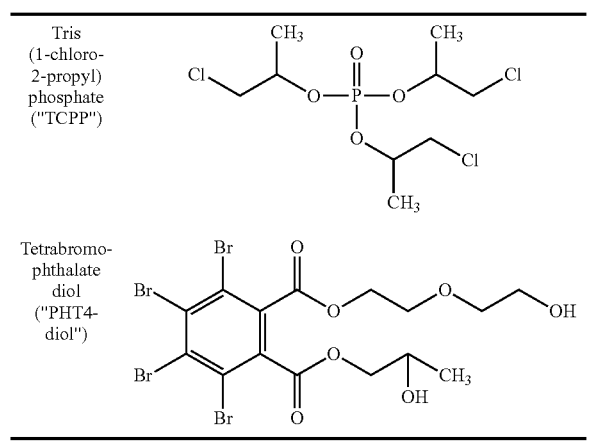

Surfactants

As illustrated in a non-exhaustive, non-exclusive, exemplary list below, there are a myriad of surfactants which are useful in modifying the properties of the reaction of a polyol with a diisocyanate to form a foam having varying characteristics. The ability to add widely varying amounts of surfactants and/or different surfactant combinations could easily be affected via either supplementing existing amounts of "B-side" surfactant(s) via the third stream or by essentially eliminating "B-side" surfactant(s) and making their addition via the third stream.

| Trade name | Composition (if known) |
| --- | --- |
| Tegostab ® B-8250 | Non-hydrolyzable (SiC) type polysilane surfactant (i.e., polysiloxane polyoxyalkylene block copolymers) |
| Tegostab ® B-8433 | Polyether polydimethylsiloxane copolymer |
| Tegostab ® B-8870 | Polyether polydimethylsiloxane copolymer |
| Dabco ® LK ® -443 | Non-silicone organic surfactant |
| Nonoxynol-9 | $CH_3(CH_2)_8$—⟨phenyl⟩—$[O\frown]_{9.5}OH$ the hydroxyl number is ~88 |
| Surfonic L12-8 ethoxylated alcohol (dodecyl alcohol ethoxylate) | $CH_3(CH_2)_{12}$—$O\frown[O\frown]_8 H$ |
| Tegostab ® B-8465 | Polyether polydimethylsiloxane copolymer |
| Surfonic N-95 | ethylene oxide content of 65.5% & HLB value of 13.1 |
| Surfynol 485 | ethoxylated acetylenic surfactant |
| Tegostab ® B-8526 | a silicone surfactant having a polydimethylsiloxane (PDMS) backbone and polyethylene oxide-co-propylene oxide (PEO-PPO) random copolymer grafts with viscosity of 3 Pas (3000 cPs). It is insoluble in water and made by Evonik. |

Tegostab® B-8250 is a modified silicone additive used to produce polyurethane rigid foams which have an open celled structure and are predominantly blown by use of water. The physical properties include a viscosity (25° C.) 2 600-3 400 mPas; a density (25° C.) of 1.02-1.04 g/ml. It is insoluble in water, but soluble in some polyols. Tegostab® B-8250 has a solidification point of below −25° C. The storage stability of Tegostab® B-8250 is 12 months—provided it is kept in originally sealed drums and protected against extreme weather conditions, particularly against heat and moisture.

Tegostab® B-8250 belongs to the group of "universal silicone stabilizers" and has a very strong nucleation and froth-supporting effect. It is among the class of highly active polysiloxane polyoxyalkylene block copolymers.

Without being held to any one theory or mode of operation, it is believed that a surfactant having a silicone surfactant having a polydimethylsiloxane (PDMS) backbone and polyethylene oxide-co-propylene oxide (PEO-PPO) random copolymer graft structure improves the functioning of the synthesized open cell polyurethane foam.

Catalysts

As illustrated in a non-exhaustive, non-exclusive, exemplary list below, there are a myriad of catalysts which are useful in effecting the reaction of a polyol with a diisocyanate to form a foam having varying characteristics. The ability to add widely varying amounts of catalysts and/or different catalyst combinations could easily be affected via either supplementing existing amounts of "B-side" catalyst(s) via the third stream or by essentially eliminating "B-side" catalyst(s) and making their addition via the third stream.

| Trade name and/or Chemical name | Chemical structure |
| --- | --- |
| Dabco ® K-15 (Potassium octoate/DEG (diethylene glycol)) | (carboxylate structure) $O^-K^+$ |
| Dabco ® TMR-20 | Proprietary K-carboxylate composition |
| DABCO ® T-120/PC 3014 (dibutyl tin dilauryl mercaptide) | $(CH_3(CH_2)_3)_2$—Sn—$(S(CH_2)_{11}CH_3)_2$ |

-continued

| Trade name and/or Chemical name | Chemical structure |
|---|---|
| Polycat ® 12 | dicyclohexylmethylamine structure |
| DMDEE | bis(2-(morpholino)ethyl) ether structure |
| Polycat ® 5 | pentamethyldiethylenetriamine structure |

What has been found to be effective is potassium and tin organometallic catalysts in a 1.5:1.0 molar ratio. If an inverse ratio is employed, the foam appears not to be dimensionally stable.

DMDEE has mild reactivity and is typically only found in one-component polyurethane foams, its use in two-component open cell foams is believed to be unique. DMDEE is classified as a blowing catalyst that does not cause crosslinking while facilitating polymeric curing. It is used for flexible polyester foams, molded foams, moisture-cured foams, and coatings.

As seen with several HFO-blown technologies, a stable/sterically hindered tertiary amine is needed to provide for polyurea reactions that product rigidity in the resultant foam. Failure to employ tertiary amine catalysts causes the foam to be "soft", dimensionally unstable, and de-adhere to common construction substrates.

Other

Water is important in this reaction, with a minimal amount of at least approximately 8 weight percent added water to the B-side formulation being necessary, more preferably at least approximately 10 weight percent or more, up to approximately 25 wt. %. The ability to add widely varying amounts of water could easily be affected via either supplementing existing amounts of "B-side" water via the third stream or by essentially eliminating "B-side" water and making its addition via the third stream of a spray gun.

For most rigid, closed cell foams, the water loading is typically less than 1.5 wt. %.

Blowing Agent(s)

As illustrated in a non-exhaustive, non-exclusive, exemplary list below, there are a myriad of blowing agents which are useful in effecting the reaction of a polyol with a diisocyanate to form a foam having varying characteristics. The ability to add widely varying amounts of blowing agents and/or different blowing agent combinations could easily be affected via either supplementing existing amounts of "A-side" and/or "B-side" blowing agent(s) via the third stream or by essentially eliminating blowing agent(s) and making their addition via the third stream.

Hydrofluoroolefins (HFOs) are unsaturated organic compounds composed of hydrogen, fluorine and carbon. These organofluorine compound are of interest as refrigerants. Unlike traditional hydrofluorocarbons (HFCs) and chlorofluorocarbons (CFCs), which are saturated, HFOs are olefins, otherwise known as alkenes.

HFO refrigerants are categorized as having zero ozone depletion potential (ODP) and low global warming potential (GWP) and so offer a more environmentally friendly alternative to CFC, HCFC, and HFC refrigerants. Compared to HCFCs and HFCs, HFOs have shorter tropospheric lifetimes due to the reactivity of the C=C bond with hydroxyl radicals and chlorine radicals.[1] This quick reactivity prevents them from reaching the stratosphere and participating in the depletion of good ozone, leading to strong interest in the development and characterization of new HFO blends for use as refrigerants.[2] Many refrigerants in the HFO class are inherently stable chemically and inert, non-toxic, and non-flammable or mildly flammable. Many HFOs have the proper freezing and boiling points to be useful for refrigeration at common temperatures. They also show promise as blowing agents, i.e. in production of insulation foams, food industry, construction materials, and others.

HFOs are being developed as "fourth generation" refrigerants with 0.1% of the GWP of HFCs. HFOs in use include: 2,3,3,3-tetrafluoropropene (HFO-1234yf, trademarked as Opteon YF) and 1,3,3,3-tetrafluoropropene (HFO-1234ze). cis-1,1,1,4,4,4-hexafluoro-2-butene (HFO-1336mzz-Z; DR-2) shows also a promise in high temperature applications like cogeneration, heat recovery and medium temperature heat pumps. trans-1,1,1,4,4,4-hexafluoro-2-butene (HFO-1336mzz-E) also has good properties.

As illustrated in a non-exhaustive, non-exclusive, exemplary list below, there are a myriad of blowing agents which are useful in effecting the reaction of a polyol with a diisocyanate to form a foam having varying characteristics. The ability to add widely varying amounts of blowing agents and/or different blowing agent combinations could easily be effected via either supplementing existing amounts of "A-side" and/or "B-side" blowing agent(s) via the third stream or by essentially eliminating blowing agent(s) and making their addition via the third stream.

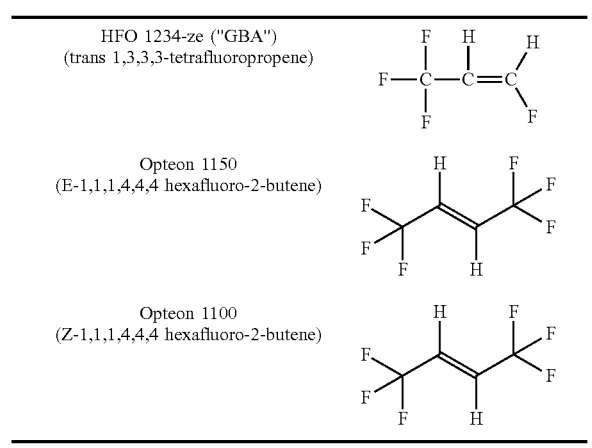

As used in this application, a non-limiting definition for the term "blowing agent" which includes miscible mixtures and azeotropes of blowing agents, means a propellant or solvent which are useful and provide efficacy to various applications in the form of performance, pressure performance, or solubility, without deleterious effect due to molar gas volume, flammability migration, or GWP reduction, yet which have a vapor pressure within defined limits as defined herein. Exemplary and non-limiting blowing agents include HFO-1336mzz or sold under the trade name Opteon® 1100 (Chemours), namely 1,1,1,4,4,4 hexafluoro-2-butene.

And while the above identified blowing agents are preferred from an ozone depletion potential (ODP) perspective as well as a global warming potential (GWP) perspective, the third stream within the spray gun offers the ability to use a myriad of blowing agents, alone or in combination with others, the combination in one aspect including all non-flammable blowing agents, while in another aspect including a combination of non-flammable and flammable blowing agents. A non-limiting list of other blowing agents includes, but is not limited to air, $C_1$ to $C_6$ hydrocarbons, $C_1$ to $C_8$ alcohols, ethers, diethers, aldehydes, ketones, hydrofluoroethers, $C_1$ to $C_4$ chlorocarbons, methyl formate, water, carbon dioxide, $C_3$ to $C_4$ hydrofluoroolefins, and $C_3$ to $C_4$ hydrochlorofluoroolefins. Examples of these non-exclusively include one or more of difluoromethane, trans-1,2-dichloroethylene, difluoroethane, 1,1,1,2,2-pentafluoroethane, 1,1,2,2-tetrafluoroethane, 1,1,1,2-tetrafluoroethane, 1,1,1-trifluoroethane, 1,1-difluoroethane, fluoroethane, hexafluoropropane isomers, including HFC-236fa, pentafluoropropane isomers of HFC-245fa, heptafluoropropane isomers, including HFC-227ea, hexafluorobutane isomers, and pentafluorobutane isomers including HFC-365mfc, tetrafluoropropane isomers, and trifluoropropene isomers (HFO-1243). Specifically included are all molecules and isomers of HFO-1234, including 1,1,1,2-tetrafluoropropene (HFO-1234yf), trans-1-chloro-3,3,3-trifluoropropene (HFO-1233zd(E)) sold under the trade name Solstice LBP by Honeywell and cis- and trans-1,2,3,3-tetrafluoropropene (HFO-1234ye), HFC-1233zd, and HFC-1225ye. The blowing agents may be used in combination with at least one co-blowing agent which non-exclusively include: hydrocarbons, methyl formate, halogen containing compounds, especially fluorine containing compounds and chlorine containing compounds such as halocarbons, fluorocarbons, chlorocarbons, fluorochlorocarbons, halogenated hydrocarbons such as hydrofluorocarbons, hydrochlorocarbons, hydrofluorochlorocarbons, hydrofluoroolefins, hydrochlorofluoroolefins, $CO_2$, $CO_2$ generating materials such as water, and organic acids that produce $CO_2$ such as formic acid. Examples non-exclusively include low-boiling, aliphatic hydrocarbons such as ethane, propane(s), i.e. normal pentane, isopropane, isopentane and cyclopentane; butanes(s), i.e. normal butane and isobutane; ethers and halogenated ethers; trans 1,2-dichloroethylene, pentafluorobutane; pentafluoropropane; hexafluoropropane; and heptafluoropropane; 1-chloro-1,2,2,2-tetrafluoroethane (HCFC-124); and 1,1-dichloro-1-fluoroethane (HCFC-141b) as well as 1,1,2,2-tetrafluoroethane (HFC-134); 1,1,1,2-tetrafluoroethane (HFC-134a); 1-chloro 1,1-difluoroethane (HCFC-142b); 1,1,1,3,3-pentafluorobutane (HFC-365mfc); 1,1,1,2,3,3,3-heptafluoropropane (HCF-227ea); trichlorofluoromethane (CFC-11), dichlorodifluoromethane (CFC-12); 1,1,1,3,3,3-hexafluoropropane (HFC-236fa); 1,1,1,2,3,3-hexafluoropropane (HFC-236ea); difluoromethane (HFC-32); difluoroethane (HFC-152a); trifluoropropenes, pentafluoropropenes, chlorotrifluoropropenes, tetrafluoropropenes including 1,1,1,2-tetrafluoropropene (HFO-1234yf), 1,1,1,2,3-pentafluoropropene (HFO-1225ye), and 1-chloro-3,3,3-trifluoropropene (HCFC-1233zd). Combinations of any of the aforementioned are useful including blends and azeotropes thereof. The relative amount of any of the above noted additional co-blowing agents, as well as any additional components included in present compositions, can vary widely within the general broad scope of the present invention according to the particular application for the composition, and all such relative amounts are considered to be within the scope hereof.

As used herein, a non-limiting definition for the term "co-blowing agent" which includes mixtures or miscible blends and/or azeotropes of blowing agents, means a one or more co-blowing agents, co-propellants, or co-solvents which are useful and provide efficacy to various applications in the form of performance, pressure performance, or solubility, without deleterious effect due to molar gas volume, flammability mitigation, or GWP reduction. These co-agents include but are not limited to those described previously.

Unlike the Prior Art, these polyurethane reactant systems can now utilize systems with pure polyether and unlike previous systems, can include an aggressive catalyst package to make insulation spray foam (as opposed to just an adhesive).

All experiments in this application employed the following recognizing that the exact percentages can vary and still produce acceptable polyurethane foam. Each can was pressurized to between 80-115 psi (typically using an inert gas, e.g., nitrogen):

| All Cans* | A-side | B-side |
|---|---|---|
| PMDI | 90% | |
| Respective blend | | 90% |
| 1234ze | 10% | 10% |
| | 100% | 100% |

Optimal A/B Ratio~1:1

TABLE I

|  |  | "B-Side" | | | | | |
|---|---|---|---|---|---|---|---|
| Polyol(s) | OH # | #1 % | #2 % | #3 % | #4 % | #5 % | #6 % |
| TB-350 [a] | 350 | 39.0 | 42.5 | 43.0 | 42.5 | 37.0 | 42.5 |
| Plasticizer | | | | | | | |
| TCPP [b] | 0 | 31.0 | 31.0 | 31.0 | 31.0 | 31.0 | 31.0 |
| Flame Retardant | | | | | | | |
| PHT4-Diol | 242 | | | | | | |
| Surfactant(s) | | | | | | | |
| B-8250 [c] | <50 | 3.0 | 3.0 | 3.0 | 3.0 | 3.0 | 3.0 |
| Surfonic N-95 [d] | 88 | 8.0 | 8.0 | 4.0 | 8.0 | 12.0 | 8.0 |
| Surfonic L 12-8 | 109 | | | | | | |
| Catalyst(s) | | | | | | | |
| Polycat 12 | 0 | | | | | | |
| Dabco ® TMR-20 | 850 | | | | | | |
| Polycat 5 | | | | | | | |
| Dabco K 15/Patcat 5001 [e] | 271 | 2.0 | 1.5 | 2.0 | 1.0 | 2.0 | 1.5 |
| DMDEE [f] | 0 | 2.0 | 1.0 | 2.0 | 1.0 | 2.0 | 1.0 |
| Dabco ® T-120/PC3014 [g] | 0 | 3.0 | 1.0 | 3.0 | 1.5 | 3.0 | 1.0 |
| Other Additive(s) | | | | | | | |
| Water [h] | | 12.0 | 12.0 | 12.0 | 12.0 | 10.0 | 12.0 |
| Total Weight | | 100.0 | 100.0 | 100.0 | 100.0 | 100.0 | 100.0 |
| Hydroxyl # total | | 897 | 908 | 907 | 908 | 769 | |
| Specific gravity (g/ml) @ RT | | 1.18 | 1.19 | 1.19 | 1.19 | 1.18 | |
| Reactivity Assessment (Pass/Fail)* | | Pass | NT | NT | NT | NT | |
| Flame Spread Index (FSI) | | 34.2 | | | | | |
| Smoke Developed Index (SDI) | | 445.0 | | | | | |
| Open Cell Content | | ≥90% | | | | | |

[a] concentration ranges from 30-50 wt. %;
[b] concentration ranges from 26-36 wt. %;
[c] concentration ranges from 1-6 wt. %;
[d] concentration ranges from 2-25 wt. %;
[e] concentration ranges from 0.5-3 wt. %;
[f] concentration ranges from 0.5-2.5 wt. %;
[g] concentration ranges from 0.5-3.5 wt. %;
[h] concentration ranges from 8-16 wt/%;
the % of [a]-[h] totaling 100%; a ratio of the at least one potassium-containing catalyst to the tin-containing catalyst being at least approximately 1.5:1.0.

What is illustrated in the above Table #1, is a low-pressure two-component open cell polyurethane foam composition in which "A-side" and "B-side" reactants comprise:

the A-side which comprises:
  at least one A-side diisocyanate and at least one HFO propellant;
the B-side comprises:
  at least one aromatic polyol, at least one B-side plasticizer, at least one surfactant, at least three catalysts, water and at least one HFO propellant;
  said at least three catalysts comprising
    at least one tin-containing catalyst and
    at least one potassium-containing catalyst; and
    at least one dimorpholino-based ether catalyst;
  the added water comprising at least 8 weight percent of said B-side reactants;
  a ratio of the at least one potassium-containing catalyst to the tin-containing catalyst being at least approximately 1.5:1.0;
  the at least one surfactant comprising a polydimethylsiloxane (PDMS) backbone and polyethylene oxide-co-propylene oxide (PEO-PPO) random copolymer grafts;

the polyurethane foam having a Class B rating with a flame spread between 25 and 75 inclusive and a smoke developed of under 450;

the polyurethane foam having a density of approximately 1 pcf;

the polyurethane foam having an R-value of 3.2 or greater; and an open cell content of at least 90% in the polyurethane foam composition.

The physical properties are characterized as follows:

TABLE II

| Property | II-12 applicator (small cylinders ~12 oz.)* | Cylinders ~7.5-12" |
|---|---|---|
| Gel (s) | 54 | 60 |
| Tack-Free (s) | 84 | 98 |
| A/B ratio | 1.15 | 1.12 |
| Density (pcf) | 0.97 | 0.84 |
| ‖Comp (psi) | 2.18 | 2.91 |
| T Compression (psi) | 3.76 | 3.89 |
| R-value (US) | 3.76 | 3.89 |

TABLE II-continued

| Property | II-12 applicator (small cylinders) ~12 oz.)* | Cylinders ~7.5-12" |
|---|---|---|
| CCC, % (closed cell content) | 8.74 | 3.32 |
| CDR | 1.00 | 1.00 |

*II-12 applicators typically weigh around 90 g empty and are filled with 350-450 g of chemical for testing purposes In the following further embodiments are disclosed.

In a first embodiment, a low-pressure two-component open cell polyurethane foam composition in which "A-side" and "B-side" reactants comprise: at least one A-side diisocyanate and at least one HFO propellant; and the B-side comprises: at least one aromatic polyol, at least one B-side plasticizer, at least one surfactant, at least three catalysts, water and at least one HFO propellant; said at least three catalysts comprising: at least one organo-tin containing catalyst and at least one potassium containing catalyst; and at least one dimorpholino-based ether catalyst; a ratio of the at least one potassium-containing catalyst to the tin-containing catalyst being at least approximately 1.5:1.0; the at least one surfactant comprising a polysiloxane polyoxyalkylene block copolymer surfactant; the added water comprises at least 8 weight percent of said B-side reactants; the polyurethane foam having a Class B rating with a flame spread between 25 and 75 inclusive and a smoke developed of under 450 using ASTM E 84 testing protocol; the polyurethane foam having a density of approximately 1 pcf (pounds per cubic foot) or less; the polyurethane foam having an R-value of approximately 3.2 or greater; and an open cell content of at least 90% in the polyurethane foam composition.

In a second embodiment of the first embodiment, the polysiloxane polyoxyalkylene block copolymer comprises a polydimethylsiloxane (PDMS) backbone and polyethylene oxide-co-propylene oxide (PEO-PPO) random copolymer grafts.

In a third embodiment of the first embodiment, the at least one aromatic polyol is selected from the group consisting of an aromatic phthalic anhydride polyester polyol, and an aromatic terephthalic anhydride polyester polyol.

In a fourth embodiment of the third embodiment, the at least one aromatic polyol is selected from the group consisting of

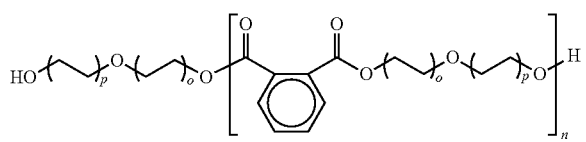

n ranges from 1-30 inclusive;
o ranges from 1 to 5 inclusive; and
p ranges from 1 to 5 inclusive; and

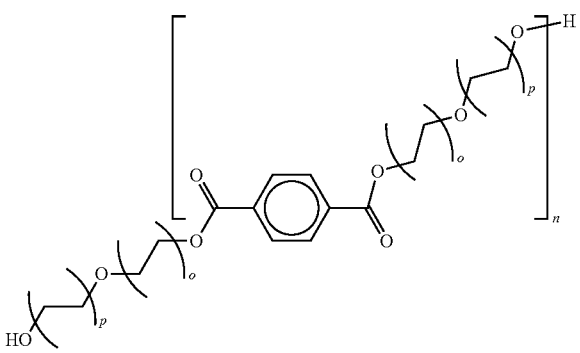

n ranges from 1-30 inclusive;
ranges from 1 to 5 inclusive; and
p ranges from 1 to 5 inclusive.

In a fifth embodiment of the first embodiment the tin-containing catalyst is an organotin mercaptide and the potassium-containing catalyst is a potassium carboxylate.

In a sixth embodiment of the fifth embodiment, the catalyst further comprises a 2,2'-dimorpholinediethylether catalyst.

In a seventh embodiment of the fifth embodiment, the tin-containing catalyst is dibutyl tin dilauryl mercaptide; and the potassium-containing catalyst is potassium octoate/diethylene glycol.

In an eighth embodiment of the first embodiment, a weight percent of added water is at least approximately 10 weight percent.

In a ninth embodiment of the eighth embodiment, a weight percent of added water is at least approximately 12 weight percent.

In a tenth embodiment of the ninth embodiment, a weight percent of added water is at least approximately 14 weight percent.

In an eleventh embodiment, a process for improving the flame resistance of a two-component open cell polyurethane foam is described comprising the steps of combining: at least one A-side diisocyanate and at least one HFO propellant; with at least one aromatic polyol, at least one B-side plasticizer, at least one surfactant, at least three catalysts, water and at least one HFO propellant; said at least three catalysts comprising at least one organo-tin containing catalyst and at least one potassium containing catalyst; and at least one dimorpholino-based ether catalyst; a ratio of the at least one potassium-containing catalyst to the tin-containing catalyst being at least approximately 1.5:1.0; the at least one surfactant comprising a polysiloxane polyoxyalkylene block copolymer surfactant; the water comprises at least 8 weight percent of said B-side reactants; the resulting open cell two-component polyurethane foam having a Class B rating with a flame spread between 25 and 75 inclusive and a smoke developed of under 450 using ASTM E 84 testing protocol; the open cell two-component polyurethane foam having a density of approximately 1 pcf (pounds per cubic foot) or less; the open cell two-component polyurethane foam having an R-value of approximately 3.2 or greater; and the open cell two-component polyurethane foam having an open cell content of at least 90%.

In a twelfth embodiment of the process of the eleventh embodiment, the polysiloxane polyoxyalkylene block copolymer comprises a polydimethylsiloxane (PDMS) backbone and polyethylene oxide-co-propylene oxide (PEO-PPO) random copolymer grafts.

In a thirteenth embodiment of the process of the eleventh embodiment, the at least one aromatic polyol is selected from the group consisting of an aromatic phthalic anhydride polyester polyol, and an aromatic terephthalic anhydride polyester polyol.

In a fourteenth embodiment of the process of the thirteenth embodiment, the at least one aromatic polyol is selected from the group consisting of

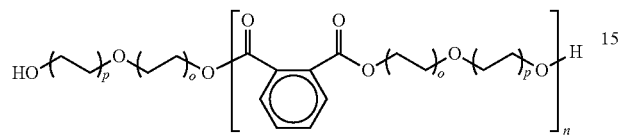

n ranges from 1-30 inclusive;
o ranges from 1 to 5 inclusive; and
p ranges from 1 to 5 inclusive; and

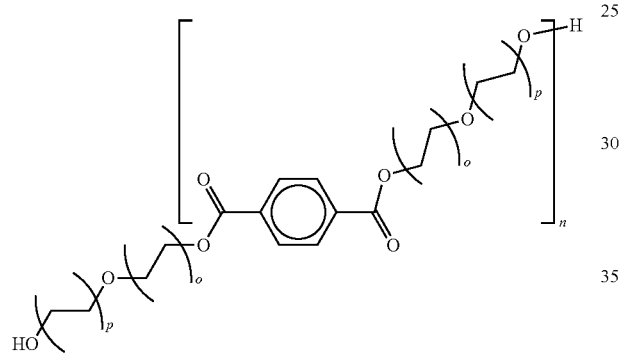

n ranges from 1-30 inclusive;
o ranges from 1 to 5 inclusive; and
p ranges from 1 to 5 inclusive.

In a fifteenth embodiment of the process of the eleventh embodiment, the tin-containing catalyst is an organotin mercaptide and the potassium-containing catalyst is a potassium carboxylate.

In a sixteenth embodiment of the process of the fifteenth embodiment, the process further comprises the step of: adding a 2,2'-dimorpholinediethylether catalyst.

In a seventeenth embodiment of the process of the fifteenth embodiment, the tin-containing catalyst is dibutyl tin dilauryl mercaptide; and the potassium-containing catalyst is potassium octoate/diethylene glycol.

In a eighteenth embodiment of the process of the eleventh embodiment, a weight percent of added water is at least approximately 10 weight percent.

In a nineteenth embodiment of the process of the eighteenth embodiment, a weight percent of added water is at least approximately 12 weight percent.

In a twentieth embodiment of the process of the nineteenth embodiment, a weight percent of added water is at least approximately 14 weight percent.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A two-component open cell polyurethane spray foam composition comprising:
   an A-side comprising:
      at least one A-side diisocyanate and at least one HFO propellant that comprises trans 1,3,3,3 tetrafluoropropene;
   a B-side comprising:
      B-side reactants comprising at least one aromatic polyol, at least one B-side plasticizer, at least one surfactant, at least three catalysts, water and at least one HFO propellant that comprises trans 1,3,3,3 tetrafluoropropene;
      said at least three catalysts consisting of:
         at least one organo-tin containing catalyst and
         at least one potassium containing catalyst; and
         at least one dimorpholino-based ether catalyst, wherein no catalyst other than the at least one organo-tin containing catalyst, the at least one potassium containing catalyst, and the at least one dimorpholino-based ether catalyst are present in the two-component open cell polyurethane spray foam composition;
      a molar ratio of the at least one potassium-containing catalyst to the at least one organo-tin containing catalyst being at least approximately 1.5:1.0;
   the at least one surfactant comprising a polysiloxane polyoxyalkylene block copolymer surfactant;
   the B-side water comprising at least 8 weight percent of said B-side reactants;
   an open cell polyurethane spray foam formed from the two-component open cell polyurethane foam composition has a Class B rating with a flame spread between 25 and 75 inclusive and a smoke developed of under 450 using ASTM E 84 testing protocol;
   the open cell polyurethane spray foam having a density of approximately 1 pcf (pounds per cubic foot) or less;
   the open cell polyurethane spray foam having an R-value of approximately 3.2 or greater; and
   an open cell content of at least 90% in the open cell polyurethane spray foam.

2. The two-component open cell polyurethane foam composition of claim 1 wherein
   the at least one aromatic polyol is selected from the group consisting of an aromatic phthalic anhydride polyester polyol and an aromatic terephthalic anhydride polyester polyol.

3. The two-component open cell polyurethane foam composition of claim 2 wherein
   the at least one aromatic polyol is selected from the group consisting of

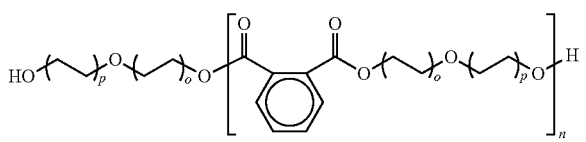

n ranges from 1-30 inclusive;
o ranges from 1 to 5 inclusive; and
p ranges from 1 to 5 inclusive; and

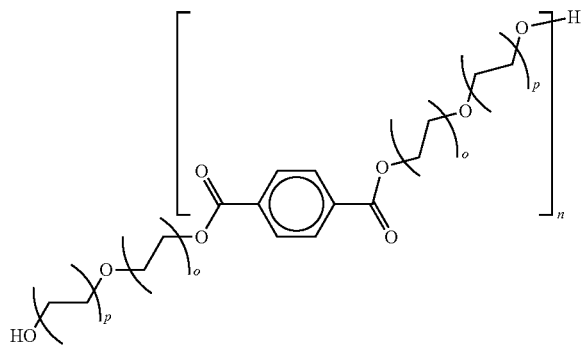

n ranges from 1-30 inclusive;
o ranges from 1 to 5 inclusive; and
p ranges from 1 to 5 inclusive.

4. The two-component open cell polyurethane foam composition of claim 1 wherein
the at least one organo-tin containing catalyst is an organotin mercaptide and the at least one potassium-containing catalyst is a potassium carboxylate.

5. The two-component open cell polyurethane foam composition of claim 4 wherein the at least one dimorpholino-based ether catalyst is a 2,2'-dimorpholinediethyl ether catalyst.

6. The two-component open cell polyurethane foam composition of claim 4 wherein
the at least one organo-tin containing catalyst is dibutyl tin dilauryl mercaptide; and
the at least one potassium-containing catalyst is a solution of potassium octoate in diethylene glycol.

7. The two-component open cell polyurethane foam composition of claim 1 wherein
a weight percent of added water is at least approximately 10 weight percent.

8. The two-component open cell polyurethane foam composition of claim 7 wherein
a weight percent of added water is at least approximately 12 weight percent.

9. The two-component open cell polyurethane foam composition of claim 8 wherein
a weight percent of added water is at least approximately 14 weight percent.

10. A process for improving the flame resistance of a two-component open cell polyurethane spray foam comprising the steps of combining:
at least one A-side diisocyanate and at least one HFO propellant that comprises trans 1,3,3,3 tetrafluoropropene;
B-side reactants comprising at least one aromatic polyol, at least one B-side plasticizer, surfactants, at least three catalysts, water and at least one HFO propellant that comprises trans 1,3,3,3 tetrafluoropropene;
said at least three catalysts comprising
at least one organo-tin containing catalyst and
at least one potassium containing catalyst; and
at least one dimorpholino-based ether catalyst;
a molar ratio of the at least one potassium-containing catalyst to the at least one organo-tin containing catalyst being at least approximately 1.5:1.0;
the surfactants comprising a first surfactant that contains a polydimethylsiloxane (PDMS) backbone and polyethylene oxide-co-propylene oxide (PEO-PPO) random copolymer graft structure and a second surfactant that is a 9.5 mol ethoxylate of nonylphenol, the second surfactant ranging from 4 weight percent to 12 weight percent of said B-side reactants;
the B-side water comprises at least 8 weight percent of said B-side reactants
the resulting open cell two-component polyurethane spray foam having a Class B rating with a flame spread between 25 and 75 inclusive and a smoke developed of under 450 using ASTM E 84 testing protocol;
the open cell two-component polyurethane spray foam having a density of approximately 1 pcf (pounds per cubic foot) or less;
the open cell two-component polyurethane spray foam having an R-value of approximately 3.2 or greater; and
the open cell two-component polyurethane spray foam having an open cell content of at least 90%.

11. The process of claim 10 wherein
the at least one aromatic polyol is selected from the group consisting of an aromatic phthalic anhydride polyester polyol, and an aromatic terephthalic anhydride polyester polyol.

12. The process of claim 11 wherein
the at least one aromatic polyol is selected from the group consisting of

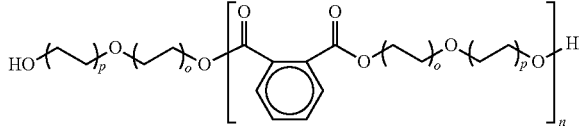

n ranges from 1-30 inclusive;
o ranges from 1 to 5 inclusive; and
p ranges from 1 to 5 inclusive; and

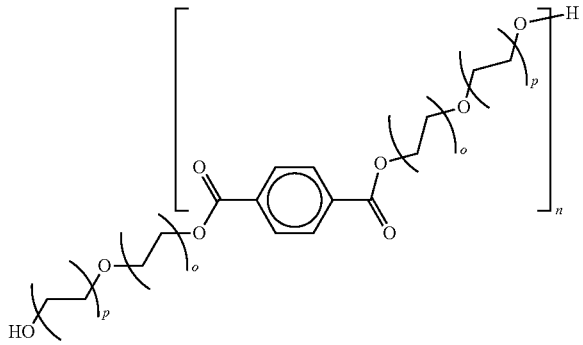

n ranges from 1-30 inclusive;
o ranges from 1 to 5 inclusive; and
p ranges from 1 to 5 inclusive.

13. The process of claim 10 wherein
the at least one organo-tin containing catalyst is an organotin mercaptide and the potassium-containing catalyst is a potassium carboxylate.

14. The process of claim 13 wherein the at least one dimorpholino-based ether catalyst is a 2,2'-dimorpholinediethylether catalyst.

15. The process of claim 13 wherein
the at least one organo-tin containing catalyst is dibutyl tin dilauryl mercaptide; and
the at least one potassium-containing catalyst is a solution of potassium octoate in diethylene glycol.

16. The process of claim 10 wherein
a weight percent of the water is at least approximately 10 weight percent.

17. The process of claim 16 wherein
a weight percent of the water is at least approximately 12 weight percent.

18. The process of claim 17 wherein
a weight percent of the water is at least approximately 14 weight percent.

* * * * *